Patented Aug. 15, 1939

2,169,546

UNITED STATES PATENT OFFICE 2,169,546

FIXING DYESTUFFS ON SUBSTRATA

Gustav Widmer, Basel, and Robert Haller, Albert Landolt, and Arthur Schürch, Riehen, Switzerland, assignors to the firm Society of Chemical Industry in Basle, Basel, Switzerland No Drawing. Application August 24, 1937, Serial No. 160,726. In Switzerland September 17, 1936

8 Claims. (Cl. 8—29)

The present invention is based on the observation that the condensation products from aldehydes and aminotriazines, which are obtainable by a process described in specification Ser. No. 68,355, are useful in the production of colored materials.

Of particular interest have proved to be the formaldehyde condensation products of 2.4.6-triamino-1.3.5-triazine; however, other aminotriazine condensation products referred to by way of example in the aforesaid specification can also be used where appropriate, for example the formaldehyde condensation products of melam, of 2-chloro-4.6-diamino-1.3.5-triazine, of 2-oxy-4.6-diamino-1.3.5-triazine and so on.

Those condensation products of these aminotriazines which are soluble and capable of being hardened are particularly suitable for use in the invention. There may be used true or colloidal solutions of these products in water or in organic solvents, such as alcohols and the like. Condensation products which are indeed insoluble in water but owing to their basic nature are soluble in concentrated or dilute acids with the formation of salts can also be used. Since the differences in solubilty of the products are to a great extent a function of the degree of condensation and of the proportion of aldehyde used, there may accordingly be used products of most varied composition in respect of chemical constitution and particle size, both products of low and of high molecular weight. For most purposes the condensation products of low molecular weight of the type of methylol-2.4.6-triamino-1.3.5-triazine, which are very soluble in water, are best suited. Like the products soluble in organic solvents they can easily be applied to the materials to be treated by impregnation, padding, printing and so on and can be converted there into insoluble form. However, products of higher molecular weight of the type of the colloidal water-soluble and hydrophilic or water-insoluble and hydrophobic formaldehyde-2.4.6-triamino-1.3.5-triazine condensation products are well suited for some purposes. The hydrophobic products are in most cases still soluble in mixtures of water and alcohol or they can be used in the form of solutions of their salts, since they dissolve easily in acids, such as hydrochloric acid, formic acid, acetic acid and so on.

Even condensation products which have been hardened can be used for the desired purpose owing to their property of dissolving in acids; by subsequent elimination of the acid they can be precipitated in an insoluble form on the material to be treated, such as a textile material.

The condensation products of aminotriazines have the property of fixing soluble dyestuffs (this expression is meant to embrace also soluble derivatives of insoluble dyestuffs), dyestuff intermediate products and so on on the material to be dyed. In this manner fixation can be brought about on materials which normally have no affinity for the dyeing agent used.

There come into consideration natural and artificial dyestuffs dissolved to produce true solutions as well as those dissolved colloidally. The dyestuffs may be dissolved in water or in an organic solvent. Solubility may be due to salt formation, to the presence of suitable substituents or to a suitable degree of distribution. Furthermore, dissolution may occur owing to the conversion of an insoluble dyestuff into a soluble leuco-form or by conversion of a leuco-compound into a soluble ester salt. Also the solubilized dyestuffs obtained by esterification of dyestuffs containing hydroxyl, according to the processes of specifications Ser. Nos. 92,244 and 92,245 (U. S. Patent No. 2,120,741), can be used. Dyestuffs of all groups are applicable, for example, acid dyestuffs, direct dyestuffs, sulfur or vat dyestuffs, basic dyestuffs or pigment dyestuffs. These dyestuffs may belong to the azo-, indigo- or thioindigo-, anthraquinone-, triphenyl-methane-, azine or oxazine-, azomethine, nitro- or stilbene-series and so on.

Instead of finished dyestuffs it is also possible to fix on the fiber dyestuff intermediate products in soluble or solubilized form (dissolved to a true or colloidal solution) by means of the aminotriazine condensation products. Suitable dyestuff intermediate products are components which are capable of conversion into dyestuffs by any known reaction, for example coupling components, diazotization components, components which form dyestuffs by condensation reactions and so on. In this connection there may be named, for example, aromatic oxy- or aminosulfonic acids or organic carboxylic or sulfonic acids which contain enolizable keto-groups and are thus capable of conversion into dyestuffs on the textile fiber by combination with diazo-compounds or by diazotization and subsequent development with coupling components.

The essence of the present invention consists in the feature that the material to be colored is treated with the soluble dyestuffs in combination with the preparation of the hardened condensation products, for instance of the 2.4.6-triamino- 1.3.5-triazine-formaldehyde condensation products, on the material.

This process may be executed in different ways which, however, are based always on the same reactions. The material to be colored may be treated with the aminotriazine condensation product and with the soluble dyestuff or intermediate product simultaneously or in succession in either order. The simultaneous treatment of the material with the condensation product and the dyestuff or intermediate product is of considerable importance since it provides a single-stage fixing process which is of especial interest in textile printing. However, the material to be dyed may first be pre-treated with the condensation product, for example by impregnation or padding, and dyed subsequently. Or the material may first be dyed, for instance, cotton may be dyed with a substantive dyestuff, and then subsequently treated with the condensation product.

At some stage or other in the process the condensation product used undergoes hardening or is rendered insoluble. The hardening may occur in a neutral, acid or basic medium and in the presence or absence of a solvent. It may be favored by the application of heat. In practice there will as a rule be used a combination of these factors; since the aminotriazine condensation products can be hardened under very mild hardening conditions any damage to the fiber can be completely avoided. By the use of a suitable accelerator, for example, preferably an acid or a salt of acid nature or a substance which splits off acid under the conditions of the process, it is possible to bring about the hardening even at ordinary temperature. The mild conditions of hardening have their foundation in the very high reactivity of the aminotriazine condensation products used in the invention. As a result of the hardening the aminotriazine condensation products are changed both chemically and physically. They rapidly become insoluble in water and pass through a series of well-defined stages of hardening which are of interest for the purpose of the invention. If, for example, a fabric is impregnated with an aminotriazine condensation product, the material quickly acquires in the rapid hardening an affinity for dyestuffs containing basic and especially acid groups so that the material, for example cellulose in the form of cotton or of regenerated cellulose, treated with the condensation products absorbs these dyestuffs in a normal dye-bath, that is to say, it is "animalized" by the treatment. The dyeing, however, is not yet fast towards boiling soap solutions. As the hardening increases the affinity of the products again becomes smaller but the fastness of the dyeings obtained improves. When completely hardened the product has only a slight, practically negligible affinity for dyestuffs, and can therefore behave as a resist. By appropriate utilization of these stages in the hardening it is possible to obtain interesting multi-color effects, for instance in printing. The foregoing circumstances also explain the fact that the simultaneous application of the dyestuffs and condensation products, followed by hardening to a high degree, leads very easily to dyeings which are completely fast to boiling with soap solutions.

It is furthermore possible to increase substantially the affinity of the hardened condensation products for acid or basic dyestuffs and hence also the affinity of the dyestuffs for fibers containing the condensation products by the simultaneous use of a basic or acid substance. For this purpose there are suitable, for example, on the one hand ethylene diamine, triethanolamine, ethylamine and so on and on the other hand oxalic acid, citric acid, gallic acid, phenols, tannin, quebracho and so on.

The present invention is applicable in the first place to textile materials such as cotton, mercerized cotton, ramie, jute, hemp, sisal; regenerated cellulose such as viscose artificial silk, acetate artificial silk; real silk, tussore silk; wool; also to other materials which may be dyed, such as paper, wood, leather, feathers, skins, furs, horn, artificial horn, ivory nut, films having a cellulose basis and so on.

The present invention renders it possible to produce dyeings of very good fastness in a simple manner with use of known and in part inexpensive dyestuffs. In particular the fastness towards aqueous agents is improved, a result which is due to the very high insensitivity of the hardened aminotriazine condensation products towards water. Not only can the fastness to water and to washing be improved but the dyeings can be so prepared that they are resistant towards boiling soap solutions.

The invention is of particular value in its application to the fixation by means of the condensation products of dyestuffs which, for example, are fast to light but are not fast to water; by means of the invention it is possible to improve in a substantial degree the fastness to washing.

Another valuable application of the invention is in the dyeing of materials with dyestuffs which normally have no affinity for the material in question; for example, acid or basic dyestuffs can be fixed on cellulose fibers or basic dyestuffs in printing on wool and silk, in each case in a form fast to washing.

In dyeing with the aid of the present invention it is also possible to cause an improvement in the fastness to rubbing of certain dyestuffs and in some cases an improvement in the fastness to light. Frequently a purer and more beautiful shade results. Furthermore, with the effects obtainable by the present invention it is also possible to combine others attainable by means of formaldehyde condensation products, for example a stiffening effect, if required in the presence of fulling agents such as boiled starch or tragacanth, a softening action by the addition of softening agents, an anti-creasing action, a water-repelling action by the addition of agents which repel water, such as paraffin, aluminum compounds and so on, an increase in the wet tensile strength, matt effects, damask effects, crepe effects, prevention of the displacement of the fibers in fabrics, prevention of the bleeding of dyestuffs on to unprinted fabrics in printing, prevention of shrinkage of the material and so on.

The condensation products from aldehydes and aminotriazines which are to be used in the invention can be prepared both in dried and in dissolved form. Likewise dyeing preparations can be produced in solid or liquid form (dye-baths, printing pastes) containing the dyeing agent and the aminotriazine condensation product and if desired a softening agent, a water-repelling agent or some other agent.

The following examples illustrate the invention; the parts are by weight unless otherwise stated and the parts by weight are related to parts by volume as is the kilogram to the litre:

Example 1

A water-soluble formaldehyde condensation product of 2.4.6-triamino-1.3.5-triazine is prepared as follows:

630 parts of 2.4.6-triamino-1.3.5-triazine are dissolved in 1700 parts by volume of a neutral aqueous solution of formaldehyde of 32 per cent. strength by volume whilst stirring in a boiling water bath. As soon as dissolution is complete the solution is cooled and allowed to stand (solution A). After 1-2 days the whole has become a solid whitish mass. It is reduced to pieces of the size of a pea and dried in a current of air at 40° C. and then powdered. This product B is the methylol compound of the triazine; it dissolves in hot water to a clear solution which can be diluted with water in an unlimited degree.

A printing paste is prepared with the aid of the above product B as follows:

150 parts of the product B are dissolved in 150 parts of hot water and the solution is at once cooled. Then there are added 300 parts by volume of a tragacanth thickening of 6 per cent. strength, 250 parts of water and 30 parts of a solution of ammonia of 25 per cent. strength. 20 parts of Orange R (Colour Index No. 161) are dissolved in 50 parts of hot alcohol and the solution is added to the above mixture whilst stirring. Before use there is added to the well-cooled printing color a solution of 25 parts of ammonium sulfocyanide in 25 parts of water. The printing color thus prepared is printed in the customary manner on a white cotton fabric and the printed material is steamed for 5 minutes in a Mather-Platt apparatus, then washed and treated for 3 minutes with a boiling soap solution containing 3 grams of Marseilles soap per litre. There are thus obtained orange effects on white cotton; they are fast towards soaping and do not bleed into the white parts.

If another acid dyestuff is used instead of the 20 parts of the above dyestuff, for example 30 parts of Brilliant Kiton Red B (Colour Index No. 748) or 30 parts of Acid Green (Colour Index No. 660) there are obtained on cotton red or green effects having the same fastness to soaping as the Orange R.

If there is used a direct cotton dyestuff, especially one which is fast to light, for instance, if, in making up the printing color instead of 20 parts of Orange R there are used 10 parts of Chlorantine Fast Orange T3RLL conc. (Schultz, Farbstofftabellen, vol. 2, page 48) or 10 parts of Chlorantine Fast Red 7B conc. (Colour Index No. 278) or 10 parts of Chlorantine Fast Blue 4GL conc. (Colour Index Supplement, page 31) there are likewise obtained printed effects which have very good fastness to washing and do not bleed into the white in boiling soap solution.

Example 2

126 parts of 2.4.6-triamino-1.3.5-triazine are mixed with 282 parts by volume of a solution of formaldehyde of 32 per cent. strength by volume having a pH-value=6.9-7 and the mixture is allowed to react on a water-bath, whereby dissolution rapidly occurs. The reaction is allowed to proceed for about ½ hour longer at an internal temperature of 80–85° C. until a sample yields a thick white turbidity when diluted with 10 times its volume of alcohol. The solution is then at once cooled and used for printing as follows (solution C):

20 parts of Acid Violet 6B (Colour Index No. 698) are dissolved in 225 parts of hot water and the solution is added to a mixture of 300 parts of the above solution C, 400 parts of a tragacanth solution of 6 per cent. strength and 5 parts by volume of a solution of ammonia of 25 per cent. strength. Before printing there is added a solution of 25 parts of ammonium sulfocyanide in 25 parts of water, the whole is well stirred and then printed on white cotton. The material is steamed for 5 minutes in a rapid steamer (Mather-Platt), washed and treated with a boiling soap solution of 0.3 per cent. strength. There are obtained violet effects which do not bleed into the white either in water or in boiling soap solution.

If there is used a formaldehyde condensation product of the above aminotriazine which has been condensed to a greater degree, for example a product which can be diluted with twice the quantity of water but is precipitated by three times the quantity of water, there are obtained analogous effects but the printed places are stiffer and harder.

Example 3

4 pieces of bleached cotton fabric are impregnated with a solution containing per litre 50 grams of product B (Example 1) and 10 grams of ammonium sulfocyanide, then pressed until twice the original weight in a foulard and finally dried in the air for 20 minutes at 70° C. Each piece is then dyed in the normal manner in an aqueous bath containing respectively one of the following dyestuffs:

| | Per cent |
|---|---|
| Kiton Blue A (Colour Index Supplement, page 44) | 1 |
| Orange II (Colour Index Supplement No. 151) | 1 |
| Alizarin Sapphire Blue B (Colour Index No. 1054) | 1 |
| or | |
| Benzyl Green B (Colour Index No. 667) | 1 |

The dyestuffs are absorbed very well by the pre-treated material whereas untreated cotton is scarcely dyed by them. The dyeings have a better fastness to water than those obtained on cotton with the usual direct dyestuffs.

If instead of the above dyestuffs there are used respectively

| | Per cent |
|---|---|
| Orange R (Colour Index No. 161) | 1 |
| Brilliant Kiton Red B (Colour Index No. 748) | 1 |
| Acid Violet 6B (Colour Index No. 698) | 1 |
| or | |
| Acid Green (Colour Index No. 660) | 1 | together with 150 parts of product B of Example 1 and 20 parts by volume of formic acid as hardening accelerator and the material is dried at room temperature there is likewise obtained a pre-treated cotton which is dyed powerful shades by these dyestuffs in normal dye-baths.

Special effects can also be produced by passing the material, which has been partly hardened at 70° C. as described in the first paragraph of this Example, between heated engraved rollers so that a higher degree of hardening is produced locally; these highly hardened places are dyed only weakly or not at all by treatment with the dyestuffs.

Example 4

2 parts of Brilliant Kiton Red B (Colour Index No. 748) are dissolved with the aid of heat in 42 parts of water and 5 parts by volume of alcohol and the solution is introduced whilst stirring into a solution of 15 parts of product B of Example 1 in 30 parts of water and 1 part by volume of ammonia solution of 25 per cent. strength. The solution is well cooled and mixed before use with 5 parts by volume of a solution of ammonium sulfocyanide of 50 per cent. strength by volume. A bleached cotton fabric is impregnated with the solution and pressed on a foulard until double its original weight, then dried in the air and thereupon steamed for 5 minutes in a Mather-Platt apparatus or hardened for 4 minutes on a metal cylinder heated to 120° C. The dyeings obtained are fast to water and withstand washing with a 0.3 per cent. soap solution for 20 minutes at 90° C.

A quite analogous behaviour is shown by the dyeings obtained with 2 parts of Acid Violet 6B (Colour Index No. 698) or 2 parts of Acid Green (Colour Index No. 660).

Example 5

4 pieces of cotton fabric are dyed in the usual manner with respectively

| | Per cent. |
|---|---|
| Direct Fast Orange SE (Colour Index No. 326) | 3 |
| Chlorantine Fast Red 5BL (Colour Index Supplement, page 32) | 3 |
| Cotton Fast Blue 3G (Colour Index No. 503) | 3 |
| or | |
| Carbide Black ER (Colour Index No. 582) | 6 |

The dried fabrics are then impregnated with a solution containing per litre 50 grams of product B of Example 1 and 10 grams of ammonium sulfocyanide, pressed on a foulard until double the original weight, dried in the air and hardened in a drying chest at 70° C. for 20 minutes. The dyeings thus obtained undergo only a slight alteration in their shade when washed with a soap solution containing 3 grams of soap per litre for 20 minutes at 90° C., whereas the corresponding dyeings which have not been after-treated become very much diminished in strength.

Example 6

A printing color is prepared as follows:

20 parts of Thioflavin T (Colour Index No. 815) or Fast Green JJO (Colour Index No. 662) or Rhodamine B (Colour Index No. 749) are dissolved in 50 parts by volume of alcohol and the solution is diluted with 290 parts of water. The solution thus prepared is introduced whilst stirring into 300 parts of tragacanth thickening of 6 per cent. strength and there are then added 300 parts of solution A of Example 1 (or 150 parts of product B of Example 1 dissolved in 150 parts of hot water and cooled immediately after dissolution); before use 40 parts of ethyl tartaric acid are added.

A bleached cotton fabric and a slightly chlorinated woollen fabric is printed in the usual manner with the above printing paste, dried, steamed for 5 minutes in a Mather-Platt apparatus, washed, soaped and dried. There are obtained prints which are fast to washing and rubbing.

If, instead of the above named basic dyestuffs there is used an acid dyestuff, for example Kiton Pure Blue V (Colour Index Supplement, page 44) or Cloth Fast Brilliant Red 2B (Schultz, Farbstofftabellen, vol. 2, page 221) there are obtained by proceeding in a like manner prints which are likewise fast to washing and rubbing.

Example 7

Pieces of cotton fabric are dyed with

| | Per cent. |
|---|---|
| Cotton Yellow CH (Colour Index No. 365) | 3 |
| or | |
| Direct Fast Orange SE (Colour Index No. 326) | 3 |
| or | |
| Chlorantine Fast Orange T3RLL (Schultz, Farbstofftabellen, vol. 2, page 48) | 3 |
| or | |
| Chlorantine Fast Red 7B (Colour Index No. 278) | 3 |
| or | |
| Chlorantine Fast Blue 4GL (Colour Index Supplement, page 31) | 3 |
| or | |
| Direct Sky Blue, green shade (Colour Index No. 518) | 3 |

After dyeing the material is treated in a foulard with a solution of 15 parts of product B of Example 1 in 80 parts of water to which have been added 5 parts by volume of an ammonium sulfocyanide solution of 50 per cent. strength, pressed until double the original weight, dried and steamed for 5 minutes in a Mather-Platt apparatus. Instead of being steamed the material may be heated at 120° C. for 4 minutes. The pieces of cotton are then soaped for 20 minutes in a solution containing 3 grams of soap per litre at 90° C. and finally rinsed and dried. The dyeings have a substantially improved fastness to washing in comparison with dyeings which have not been pre-treated, since they prove to be fast to boiling soap solution, whereas on the contrary the dyeings which have not been pretreated bleed strongly on to washed white cotton when subjected to a like treatment. The dyeings obtained with Direct Fast Orange SE and Direct Sky Blue green shade, are also improved in respect of their fastness to light by the after-treatment.

Example 8

A cotton fabric is impregnated on the foulard with a solution containing 150 grams of the product B of Example 1,
50 grams Indigosol O (Colour Index No. 1178), and
20 cc. of 82 per cent. formic acid per litre, then pressed to a solution content of 200 per cent. of its dry weight and dried on the tentering frame at a low temperature. The fabric is then developed for 10 minutes at ordinary temperature in a solution containing 20 cc. sulfuric acid 60° Bé. and 1.25 grams sodium nitrite per litre. There is obtained a blue even dyeing of good fastness to washing, and the developing bath is not colored. If the same treatment is carried out without the addition of the product B of Example 1 the dyestuff bleeds strongly into the developing bath with consequent loss of color.

Example 9

Cotton sateen is impregnated with the following solution:

15 parts by weight of the product B of Example 1,
82 parts by volume of water,
2 parts by weight of the sodium salt of 2-naphthol-6-sulfonic acid (Schaeffer's salt),
2 parts by volume of 82 per cent. formic acid.

Thereupon the fabric is pressed to a solution content of 200 per cent. of its dry weight and dried. It is then developed in a solution containing 1.8 grams of diazotized aniline per litre of weak acetic acid solution. A deep orange dyeing having good fastness to rubbing and washing is at once obtained. Cotton fabric which is processed in the same way, but without the use of the product B of Example 1, is only very weakly colored because the dyestuff bleeds out completely in the bath.

*Example 10*

Cotton fabric is dyed in the customary manner for 1 hour at boiling temperature with 5 per cent. Rosanthrene B (Colour Index No. 324a) with the addition of 30 per cent. sodium sulfate cryst. It is then rinsed and squeezed out. The still moist fabric is foularded several times with a solution containing 150 grams of the product B of Example 1 and 20 cc. of 82 per cent. formic acid per litre, and thereafter pressed to a solution content of 200 per cent. The fabric is dried in the air and treated for the purpose of hardening on a hot plate for 4 minutes at 120° C. The dyed and rinsed material is treated for 20 minutes in a fresh cold bath containing 2.5 per cent. sodium nitrite and 7.5 per cent. hydrochloric acid 20° Bé. It is then quickly rinsed in cold water and immediately entered into a developing bath of the following composition:

1 per cent. β-naphthol is dissolved in 1 per cent. soda solution 40° Bé. and 20 times the quantity of boiling water, and added to the cold liquor. The goods are treated for 20 minutes in the cold bath, rinsed and dried. A deep red dyeing is obtained having a fastness to washing which is better than that obtained without the use of the product B of Example 1.

*Example 11*

The fixation of a vat dyestuff on cotton in a printing process can be carried out as follows: 30 parts by weight of the product B of Example 1 are dissolved in 320 parts by volume of boiling water. The solution is cooled to room temperature and mixed with 500 parts by weight of neutral starch-tragacanth-thickening. 150 parts by weight of Ciba Blue 2BD (Colour Index No. 1184) or Cibanone Blue GCD in paste (Colour Index Supplement, page 35) are added to this mixture and the whole well stirred. Bleached cotton is printed in the usual manner with this printing paste. The goods are dried and drawn on the foulard through a solution heated to 40° C. consisting of the following mixture:

500 parts by weight of water,
100 parts by volume of glycerine,
100 parts by weight of potash,
100 parts by weight of hydrosulfite R conc.,
3 parts by weight of isopropylnaphthalene-sulfonic acid,
50 parts by weight of Glauber's salts cryst. and made up to 100 parts by volume.

The goods are dried, steamed for 5 minutes in the Mather-Platt, washed and soaped for ½ hour at the boil. A colored print on a white ground is obtained which is completely fast to washing.

In a similar manner prints fast to washing may be obtained free from other vat dyestuffs.

The procedures described in the various examples can, of course, be combined still further with one another and mention may particularly be made of the effects obtainable by local hardening or by local differences in hardening. Moreover, various characteristic effects can be obtained not only with dyestuffs but also with their intermediate products.

*Example 12*

10 parts of Brilliant Kiton Red B (Colour Index No. 748) are dissolved in 210 parts of water while adding 25 parts by volume of alcohol. This solution is mixed with a second solution which has been produced by dissolving 75 parts of product B in 150 parts of water while adding 5 grams of ammonia. After cooling 25 parts of an ammonium rhodanine solution of 50 per cent. strength are added to this mixture. If various objects such as filter paper, foils from regenerated cellulose, wood chips, or leather are saturated with such a solution, dried and heated for 4 minutes at 120° C., they are dyed red or pink tints fast to water. Orange or red orange dyeings are obtained on the same materials when substituting Orange II (Colour Index Supplement No. 151) for the Brilliant Kiton Red B.

What we claim is:

1. A process for the production of colored materials comprising applying a soluble dyestuff to the material and affixing the said dyestuff by forming a hardened condensation product of 2.4.6-triamino-1.3.5-triazine and formaldehyde on the material, said condensation product being formed on said material at any stage of the coloring process.

2. A process for fixing soluble dyestuffs on materials comprising forming a hardened condensation product of 2.4.6-triamino-1.3.5-triazine and formaldehyde on the material in the presence of the dyestuff.

3. A process for fixing soluble dyestuffs on fibers, characterized by the feature that prior to the application of the soluble dyestuffs a hardened 2.4.6-triamino-1.3.5-triazine-formaldehyde condensation product is formed on the fiber.

4. A process for fixing soluble dyestuffs on fibers, characterized by the feature that simultaneously with the application of the soluble dyestuffs a hardened 2.4.6 - triamino - 1.3.5 - triazine-formaldehyde condensation product is formed on the fiber.

5. A process for fixing soluble dyestuffs on fibers, characterized by the feature that after the application of the soluble dyestuffs a hardened 2.4.6-triamino- 1.3.5-triazine-formaldehyde condensation product is formed on the fiber.

6. A process for fixing acid dyestuffs on fibers, characterized by the feature that prior to the application of the acid dyestuffs a hardened 2.4.6-triamino-1.3.5 - triazine-formaldehyde condensation product is formed on the fiber.

7. A process for fixing acid dyestuffs on fibers, characterized by the feature that simultaneously with the application of the acid dyestuffs a hardened 2.4.6-triamino-1.3.5 -triazine-formaldehyde condensation product is formed on the fiber.

8. A process for fixing acid dyestuffs on fibers, characterized by the feature that after the application of the acid dyestuffs a hardened 2.4.6-triamino-1.3.5-triazine-formaldehyde condensation product is formed on the fiber.

GUSTAV WIDMER.
ROBERT HALLER.
ALBERT LANDOLT.
ARTHUR SCHÜRCH.